United States Patent [19]
Michael

[11] 3,897,869
[45] Aug. 5, 1975

[54] CONVEYOR CONSTRUCTION
[75] Inventor: Vesta F. Michael, Big Spring, Tex.
[73] Assignee: Fiber Glass Systems, Inc., Big Spring, Tex.
[22] Filed: June 28, 1973
[21] Appl. No.: 374,511

[52] U.S. Cl. ............... 198/218; 156/433; 198/179; 198/165
[51] Int. Cl. ............................................. B65g 25/06
[58] Field of Search ............ 198/75, 162, 179, 218, 198/180, 165; 156/296, 433, 434, 439

[56] References Cited
UNITED STATES PATENTS

| | | | |
|---|---|---|---|
| 1,644,462 | 10/1927 | Bachofen | 198/180 |
| 1,849,045 | 3/1932 | Wolf | 198/165 |
| 2,387,446 | 10/1945 | Herz | 198/162 |
| 2,736,419 | 2/1956 | Ferro | 198/75 |
| 2,862,605 | 12/1958 | Grevich | 198/162 |
| 2,879,882 | 3/1959 | Whelan | 198/162 |
| 2,880,998 | 4/1959 | Middleton et al. | 198/162 |
| 2,932,379 | 4/1960 | Rangabe | 198/179 |
| 3,246,816 | 4/1966 | Dexter et al. | 198/179 |
| 3,726,389 | 4/1973 | Klein et al. | 198/179 |
| 3,796,298 | 3/1974 | Russell | 198/139 |

*Primary Examiner*—Evon C. Blunk
*Assistant Examiner*—Richard K. Thomson
*Attorney, Agent, or Firm*—Neuman, Williams, Anderson & Olson

[57] ABSTRACT

Parallel, flexible, strip conveyors are played out from a source such as a reel or the like in substantially parallel spaced relation at one end, and wound upon a windup reel in abutting relation at their opposite ends. An item to be conveyed is located between the spaced strips whereafter clamp means urge the strips together to clampingly engage the item and move the same as the strips move between the reels. By arranging pairs of the strips in spaced, parallel, aligned relation, flexible assemblages such as are employed in the manufacture of glass-reinforced plastic pipe may be engaged at opposed ends and conveyed in a taut condition about a pipe-forming mandrel.

10 Claims, 9 Drawing Figures

PATENTED AUG 5 1975　　　SHEET　　1　　　3,897,869

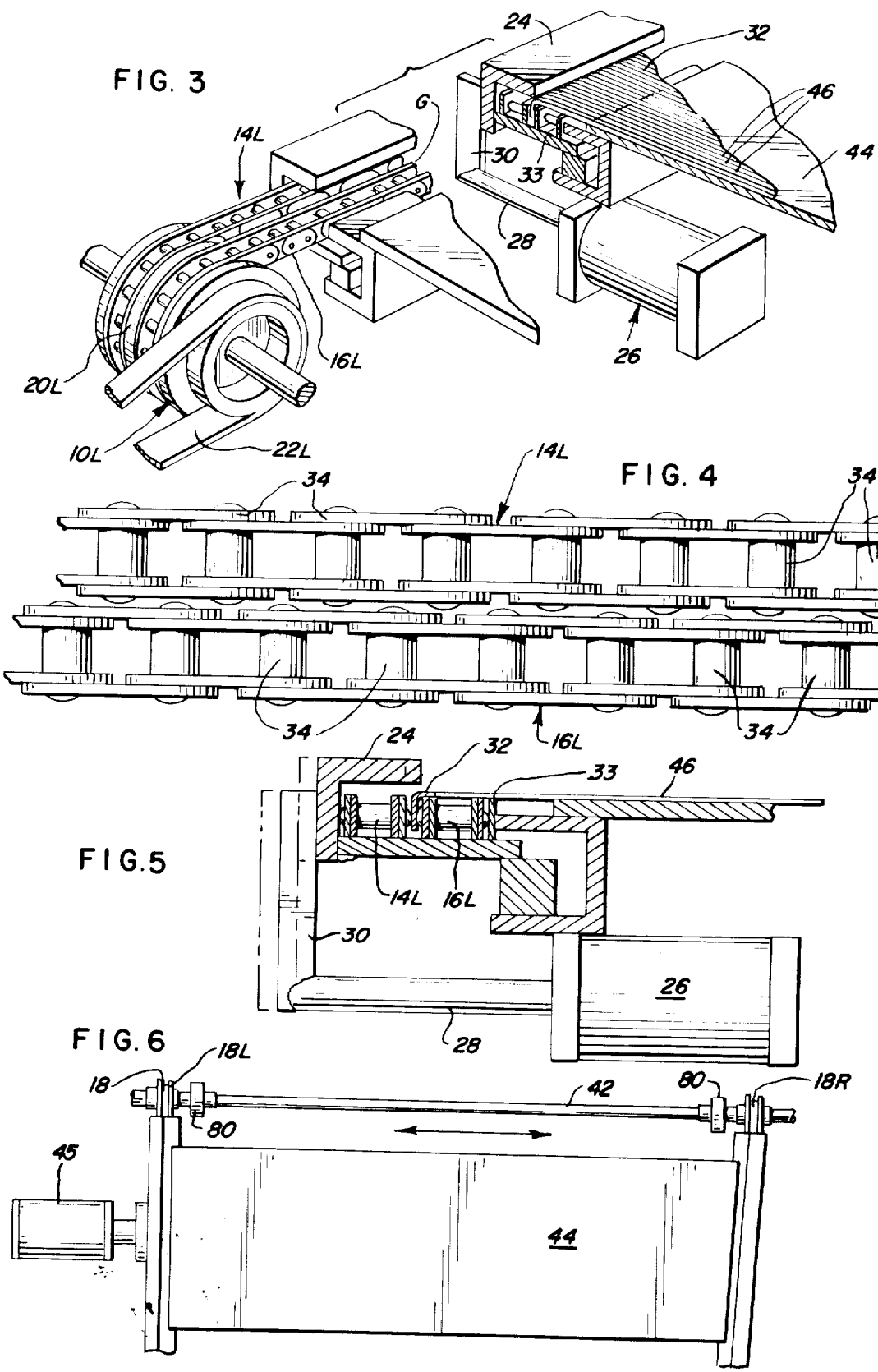

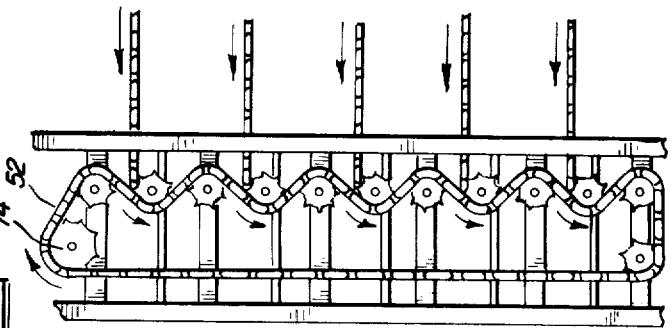
FIG.9
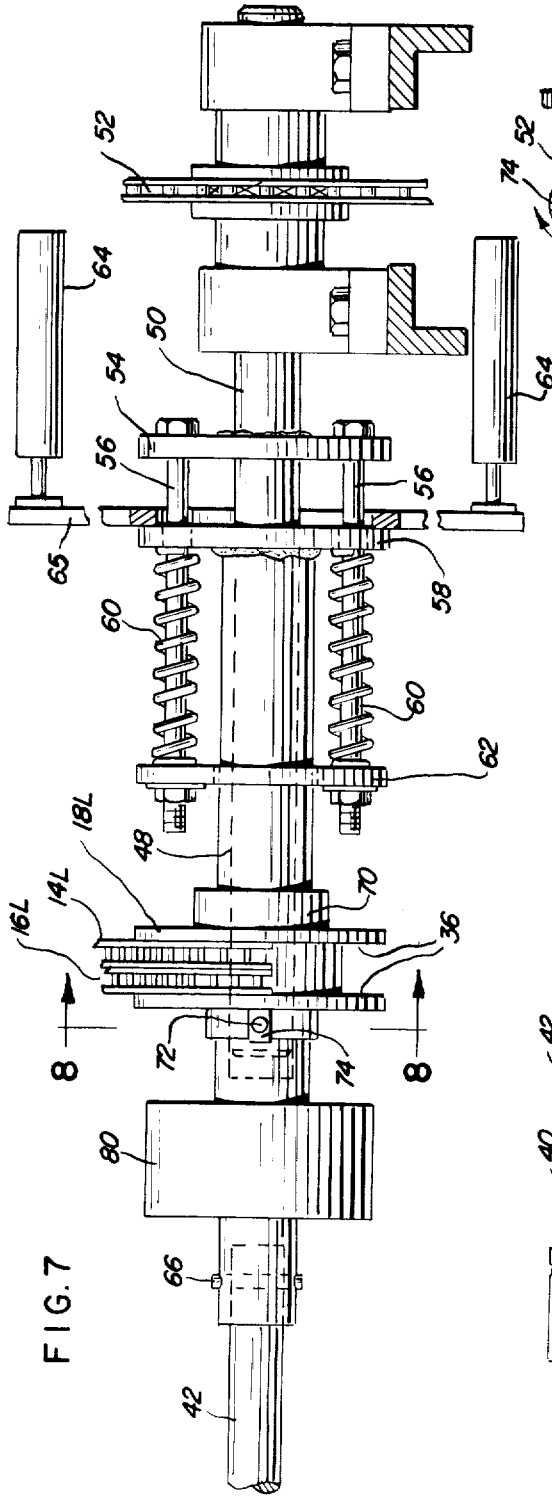
FIG.7
FIG.8

CONVEYOR CONSTRUCTION

FIELD OF THE INVENTION

This invention relates to a novel conveyor which may be formed of flexible strips such as chain belt segments arranged in spaced, parallel pairs. The chains are played out from a source reel and wound at their distal ends about a take-up reel. Items such as parallel strands of glass roving may be engaged by said chains at their opposed longitudinal end portions, moved while in a taut condition transversely to the longitudinal axes of said strands, and wound about a mandrel or the like. The conveyor of this application is particularly adapted for use in the formation of glass-reinforced plastic pipe of the type disclosed in my U.S. Pat. Nos. 3,231,442 granted Jan. 22, 1966, and 3,381,716 granted May 7, 1968.

BACKGROUND OF THE INVENTION

In a known method of forming glass-reinforced resin pipe a longitudinal assemblage of untwisted glass roving strands is positioned about the periphery of a rotatable mandrel disposed in a lathe-type machine. The mandrel has a parting agent such as a wax coating on the outer peripheral surface thereof. The strands are saturated with a hardenable resin such as epoxy resin whereafter a tie-down wrap of spaced glass spirals is applied to prevent fly-out in the course of mandrel rotation. A continuous spiral wrap of glass roving is then applied, followed by alternate layers of longitudinal and other helical roving, all of which layers are saturated in resin until the desired pipe wall thickness is obtained. The final pipe product thus incorporates alternate layers of longitudinal and spiral glass roving embedded in a hardened resin matrix. Such pipe has great strength and serves large numbers of special applications which cannot employ steel pipe.

One of the more exacting and time-consuming steps employed in the pipe formation comprises the positioning of the glass longitudinal strand assemblages about the mandrel. Such step usually requires a large amount of manual labor to assure proper affixation and locking of the glass strands at opposed longitudinal ends to the mandrel. Following disposition about the mandrel, the longitudinal strands must be evenly distributed about the mandrel periphery so that uniform pipe wall reinforcement is afforded by the strands.

SUMMARY OF THE INVENTION

In accordance with this invention a novel conveyor, which may be formed of chain belt segments or the like, is provided and particularly adapted to readily convey an assemblage of glass roving strands into desired uniform arrangement about the periphery of a rotatable mandrel. The usual, necessary labor involved in manually arranging a longitudinal assemblage of parallel roving strands is minimized by use of the conveyors provided.

The conveyors comprise spaced pairs of parallel strips: each strip may comprise a chain belt segment. Each chain belt is anchored on one end on a "play-out" or source reel and at the opposed end to a wind-up reel. The reels rotate in synchronization with the chains of each conveyor system maintained taut. The chains are slightly spaced apart by peripheral central reel dividers on the play-out reels, effecting adjacent such reels desired intervals between the chains which are adequate to receive the strands or other items to be conveyed by the chains between the reels. After the opposed glass strand ends (which are preferably secured to longitudinal end strips by adhesive, staples or the like) are inserted between the chains of spaced conveyors, movable clamping bars urge one of the chain belts of each pair against the adjacent side of the other chain belt in said pair. The clamps also simultaneously urge the chain belts against guide bars disposed between the two reels of each conveyor system. The clamp action securely locks the ends of the strands between the chains so as to be movable therewith. By locking the opposed strand ends in spaced aligned pairs of conveyors and arranging the spaced wind-up reels of the conveyors so as to be in straddling concentric relation with the ends of the mandrel, a filamentous glass assemblage may be readily conveyed by the chain conveyors in a semi-automatic manner into desired mandrel-encompassing relation, whereafter the filament ends are readily clamped in place.

To eliminate any undesired sagging in the assemblage strands when disposed in position about the mandrel, means are preferably provided for rendering the strands of the conveyed assemblage taut. Such means may comprise a hydraulic piston system connected to one of the conveyor systems which is adapted to effect a desired tautness in the strands by movement of the movable conveyor system after both ends of the roving assemblage are locked in place, away from the fixedly positioned conveyor system. An alternate method of effecting tautness adequate to remove slack, is to arrange one pair of conveyor strips or belts at an angle directed away from the opposed strips whereby the inter-conveyor distance progressively increases as the strands approach the wind-up reels.

It is an object of this invention therefore to minimize the time and labor previously expended in arranging a flexible roving assemblage in desired, uniform, surrounding relation about the periphery of a mandrel.

It is another object of the invention to provide a novel conveyor construction employing ordinary chain belt segments which may be employed to move a flexible assemblage into desired encompassing relation about an elongate central axis or mandrel.

It is a further object of the invention to provide a method and conveyor arrangement particularly adaptable for automating the formation of glass-reinforced plastic pipe whereby a plurality of pipes may be simultaneously formed in a semi-automatic manner.

The above and other objects of this invention will become more apparent from the following detailed description when read in the light of the accompanying drawings and appended claims.

DESCRIPTION OF THE DRAWINGS

For a more complete understanding of this invention, reference will now be made to the drawings wherein:

FIG. 3 is a fragmentary perspective view illustrating in detail the play out reel and clamping mechanism employed in one embodiment of the conveyor of this invention;

FIG. 4 is a top plan view illustrating chain belt segments which may be employed in the conveyor of this invention;

FIG. 5 is a fragmentary sectional view illustrating chain belts of the provided conveyor in clamped, conveying relation;

FIG. 6 is a fragmentary schematic place view illustrating conveyor arrangements for imparting tautness in the course of winding a flexible strand assemblage about a mandrel.

FIG. 7 is a fragmentary elevational view partly in section illustrating mechanism employed with the conveyor of this invention for tensioning a mandrel used in conjunction therewith;

FIG. 8 is a sectional view taken on line 8—8 of FIG. 7; and

FIG. 9 is a schematic elevational view illustrating a chain drive for simultaneously operating a series of five superposed conveyors made in accordance with this invention.

A more complete understanding of this invention will be obtained from the following detailed description when read in the light of the accompanying drawings and appended claims.

DESCRIPTION OF THE INVENTION

Figure 1:
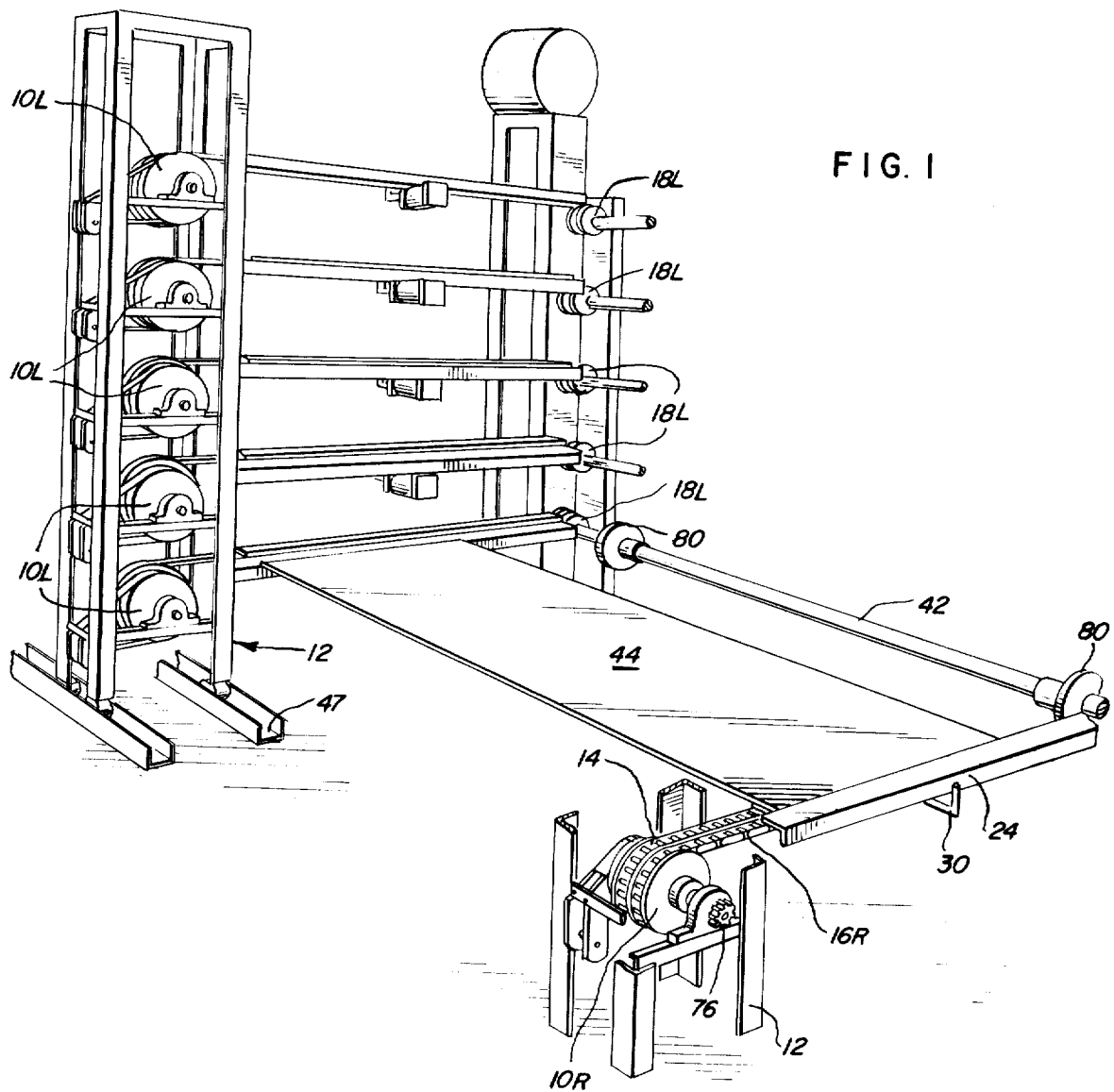
FIG. 1 is a fragmentary perspective view of a series of conveyors made in accordance with this invention.

Referring now to the left portion of FIG. 1, a plurality of superposed play-out reels 10L are illustrated in vertical alignment supported in a framework 12. Each play-out reel has anchored thereto proximal end limits of parallel chain belts 14L and 16L (see FIG. 3). Each conveyor assembly includes a play-out reel 10L connected by the conveyor chains 14L and 16L to wind-up reel 18L.

As will also be noted from FIG. 3, each reel 10L may engage a tension strap 22L which is spring loaded and adjustable to regulate the precise location of reel 10L mounted in movable bearings and the resulting tension in chains 14L and 16L. Each reel 10L also has an annular spacer 20L thereby maintaining the chains 14L and 16L in spaced relation when wound thereon and when unwound therefrom in parallel relation so as to leave a gap G therebetween.

In accordance with this invention, a strip to be conveyed by the chains 14L and 16L, such as strip 32 illustrated in FIG. 5 and FIG. 3, is inserted in the gap G between the chains. A clamping means such as inverted L-clamp 24, actuated by air cylinder 26 to which connected by rod 28 and plate 30 as shown in FIG. 3, is then actuated to urge the adjacent chain surfaces together against a guide surface 33. The chains themselves may have sufficient "give" to enable them to be urged into abutting relation or the tension strap 22L may allow desired chain movement of the reels 10L.

The chain belt segments 14L and 16L are preferably arranged as illustrated in FIG. 4 with the ends of pins 34 in staggered interfitting relation for greater gripping effect.

In the normal course of conveying the strip 32 lockingly engaged between the chain belts 14L and 16L the belts are unwound from the play-out reel 10L, moved by the chains along the straight guide surface 33 which slidably engages the ends of the pins 34 of chain belt 16L prior to the chains being wound about the outer periphery of wind-up reel 18L to which the distal ends of chains 14L and 16L are anchored. Since the chains 14L and 16L are not continuous belts but merely chain segments, the segments 14L and 16L have a limited travel about wind-up reel 18L, after which the chains are rewound about play-out reel 10L as the rotation of the reels 10L and 18L and the direction of chain movement are reversed.

FIG. 7 illustrates in greater detail the wind-up reel 18L and in particular the manner wherein the chains 14L and 16L are wound up in contiguous, non-spaced relation about the reel periphery between annular flange surfaces 36.

FIG. 8 illustrates an auxiliary means for maintaining tension in chains 14L and 16L, comprising spring-loaded roller 38 which is urged by spring 40 and pivot arm 42 against upper surfaces of the side-by-side chains 14L and 16L as they are wound about the periphery of the reel 18L.

In one application for which the chain belt conveyor of this invention is particularly adapted, each conveyor system as above described employing play-out reel 10L and wind-up reel 18L is adapted to be employed with a twin right-hand conveyor system, play-out reel 10R of which is illustrated in FIG. 1.

Such application comprises the positioning by means of the provided conveyors of parallel strands of a reinforcing strand assemblage about the outer periphery of a pipeforming mandrel such as mandrel 42 illustrated in FIG. 1. Such parallel strand assemblages are adapted to afford longitudinal reinforcements in a glass-reinforced plastic pipe member such as disclosed in my earlier patents 3,231,442 and 3,381,716.

In the normal course of positioning parallel glass strands in desired peripheral disposition about a mandrel, the strands are preferably secured at opposed longitudinal ends to anchor strips (such as the strip 32 illustrated in FIGS. 3 and 5) by adhesive, staples or the like. The opposed strips 32 are then placed in the gaps G between chains 14 and 16 of the right and left conveyor systems. The clamp 24 of each system is actuated to urge the chains of each system together, and motive means actuated to simultaneously drive the play-out and wind up reels of the right and left systems. As seen in FIG. 1 a flat bed 44 is disposed between the opposed right and left conveyor systems to support strands such as strands 46 illustrated in FIGS. 3 and 5 shown connected to the left anchor strip 32.

It is desired that the glass or other reinforcing strands 46 be arranged about the mandrel 42 in a non-sagging, straight condition. Such slack elimination step may comprise the increasing of the interval between the chain conveyors as the wind-up reels 18L and 18R are approached and the strips 32 are moved by the conveyor chains. Thus as noted in FIG. 6 as the wind-up reels 18L and 18R are approached, the inter-strip distance increases tending to remove any slack in the strands secured to the strips. As an alternative, either the right or left-hand conveyor assemblies may be movable away from the opposite assembly a predetermined interval after the opposed strips 32 are locked between the chain belts 14 and 16. Such movement may be effected by a hydraulic ram which moves either conveyor assembly along a short track.

Thus ram 45 in FIG. 6 may move the left conveyor assembly along a track such as tracks 47 illustrated in FIG. 1.

Figure 2:
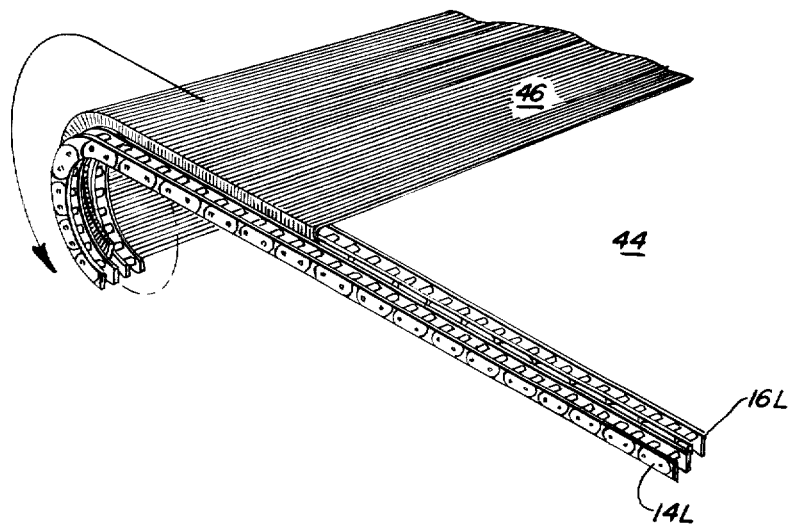
FIG. 2 is a fragmentary perspective view of a strand assemblage being wound into place about an annular surface.

FIG. 2 schematically illustrates the manner whereby the travel of the chain belts 14L and 16L about the wind-up reel will form the strands 46 in a desired cylindrical arrangement around a centrally disposed mandrel.

It is desired that the rotatable mandrel 42 be under tension so as to be desirably straight during pipe formation. FIG. 7 illustrates the wind-up reel 18L disposed on a rotatable collet 48 having a hollow center for reception of drive shaft 50 on which a drive sprocket is mounted and rotatably driven by chain 52. Anchor plate 54 is welded to shaft 50 and elongate bolts 56. Bolts 56 traverse plate 58 which is welded to the collet 48. Compression springs 60 are interposed plate 58 and floating plate 62.

The collet 48 is longitudinally movable by hydraulic units 64 and push plate 65 to the left as illustrated in FIG. 7 enabling the hollow collet end to engage the pin end of mandrel 42 by means of pin 66. After the mandrel is pinned to the collet, the hydraulic units 64 retract enabling the mandrel 42 to be placed under a desired tension and remain straight during pipe formation.

Collar 70 on which reel 18L is mounted may be releasably engaged to collet 48 by means of spring-loaded pin 72 which is mounted on bracket 74 secured to one of the annular plates 36. The releasable connection between the collar 70 and collet 48 allows the desired collet movement for mandrel engagement without disturbing the desired position of the conveyor chains 16L and 14L.

FIG. 9 illustrates the manner whereby a single motive means 74 may drive chain 52 and drive shaft 58 associated with each wind-up reel 18L. A single drive chain may similarly drive a series of opposed play-out reels by engaging sprocket 76 associated with each play-out reel as shown in connection with reel 10R illustrated in FIG. 1.

Collar members 80 illustrated in FIGS. 1, 6 and 7 enable the strand assemblies to be locked in place by serving as a tie-down area prior to the application of spiral windings in the normal course of pipe formation.

It is apparent that the chain belts 14 and 16 may be substituted by other forms of belts such as solid non-stretchable rubber belts, and means such as electromagnetic forces may be substituted for clamp means for urging metal conveyor belts together. The provided conveyors are durable and readily fabricated of available standard machinery components.

What is claimed is:

1. A conveyor comprising flexible discrete strips in side by side relation and movable into spaced and abutting dispositions, means engaging opposed, outer side portions of said strips and urging said strips toward each other into a clamping relationship whereby an object positioned between said strips while said strips are in spaced arrangement may be clampingly engaged by opposed inner side portions of said strips, and means for engaging end portions of each of said strips and for moving said strips while in clamping relationship about an annular surface; said strips comprising chain belt segments having projecting pins, the pins of one belt being located between the pins of the other belt when said belts are in tight abutting relationship.

2. The conveyor of claim 1 in which said strips are played out from a play-out reel in adjacent parallel relation and said annular surface comprises a wind-up reel.

3. The conveyor of claim 1 in which clamp means spaced from said play-out reel urges the side of one of said strips against the adjacent side of the other strip and urges the far side of the other strip against a guide surface disposed between the play-out and wind-up reels.

4. A conveyor system comprising opposed, substantially parallel pairs of flexible discrete strips, the strips of each pair being in side by side relation and movable into spaced and abutting dispositions; means engaging opposed, outer side portions of said strips of each pair and urging said strips of each pair toward each other into a clamping relationship whereby opposed ends of a flexible elongate object positioned between said strips of each pair while said strips are in spaced arrangement may be clampingly engaged by opposed inner side portions of said pair strips; and means for engaging end portions of each of said strip pairs and for moving each of said strip pairs simultaneously with the other of said strip pairs while the strips of each pair are in clamping relationship, about an annular surface.

5. The conveyor of claim 4 in which said flexible strips are substantially non-stretchable, the movement of said strips from said spaced relation to said abutting relation is small; and at least one end of each of said strips is resiliently anchored.

6. The conveyor of claim 4 in which one conveyor strip pairs is movable away from the other conveyor strip pairs and is in combination with means for effecting relative movement between said strip pairs whereby such elongate item having opposed end portions clampingly engaged to said parallel pairs may be rendered taut.

7. A method of arranging filamentous reinforcements about a rotatable mandrel in the formation of filament reinforced plastic pipe, the steps comprising clampingly engaging opposed end portions of an assemblage of parallel filamentous reinforcements between opposed parallel pairs of flexible strip conveyors; said assemblage having a width at least as great as the length of the circumference of the mandrel about which said assemblage is to be disposed, anchoring the distal ends of said opposed parallel pairs of strip conveyors to the peripheries of wind-up reels straddling and concentric with the ends of said mandrel, and simultaneously winding up said spaced strip conveyors on said wind-up reels with said filamentous assemblage clamped therebetween whereby said filamentous reinforcements are peripherally arranged about the mandrel periphery.

8. The method of claim 7 in combination with the step of moving said strip conveyors away from each other after the assemblage ends are anchored thereto to eliminate any slack in the filaments.

9. The method of claim 7 in combination with the step of urging said strips of each conveyor together against a guide surface leading to a wind-up reel after said assemblage is clamped to said strip conveyors.

10. In a method of arranging filamentous reinforcements about a rotatable mandrel the steps comprising arranging the reinforcements parallel to the mandrel, clamping opposed end portions of the filaments between opposed pairs of flexible belts straddling the ends of the mandrel, and winding the flexible belts about annular surfaces concentric with the mandrel ends and having diameters at least as great as said mandrel.

* * * * *